June 5, 1956   O. W. DILLON   2,748,630
DRILLING MACHINE

Filed Dec. 31, 1952   3 Sheets-Sheet 1

INVENTOR
OSCAR W. DILLON
BY
Louis L. Gagnon
ATTORNEY

June 5, 1956     O. W. DILLON     2,748,630
DRILLING MACHINE

Filed Dec. 31, 1952     3 Sheets-Sheet 2

INVENTOR
OSCAR W. DILLON
BY
Louis L. Gagnon
ATTORNEY

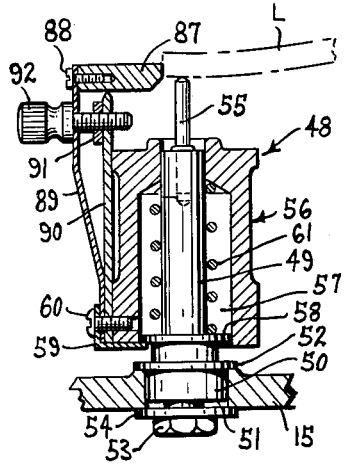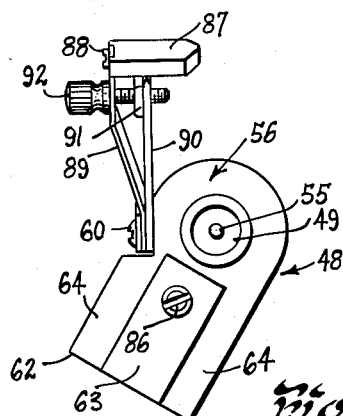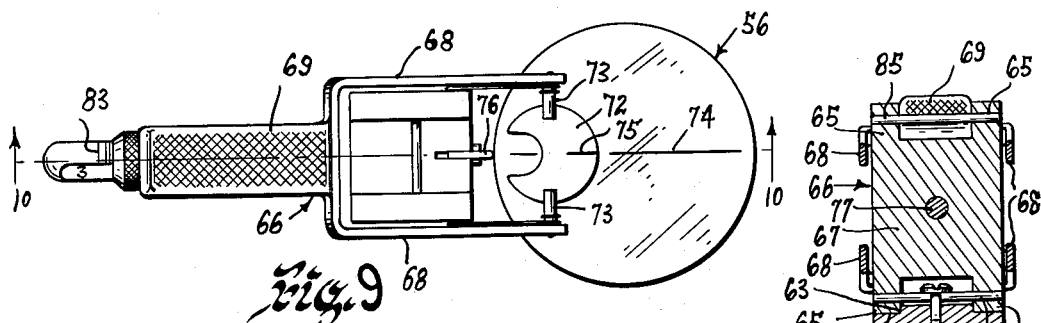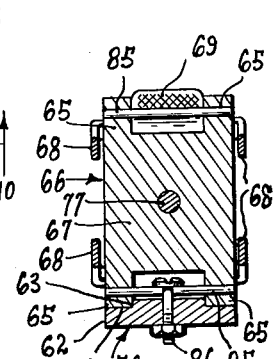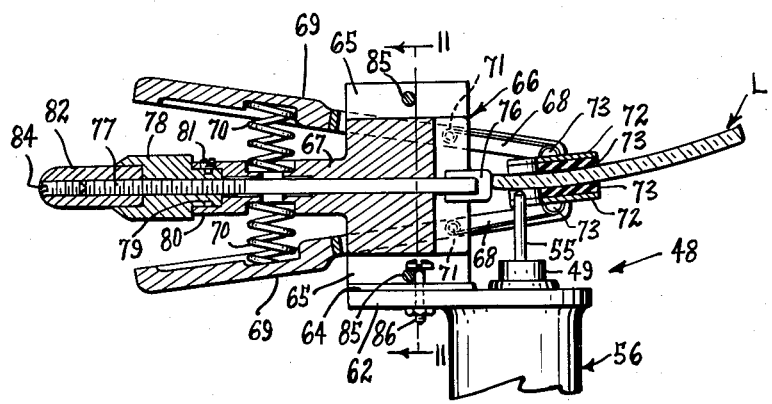

United States Patent Office 2,748,630
Patented June 5, 1956

2,748,630

DRILLING MACHINE

Oscar W. Dillon, Sturbridge, Mass., assignor to American Optical Company, Southbridge, Mass., a voluntary association of Massachusetts Application December 31, 1952, Serial No. 329,009

13 Claims. (Cl. 77—63)

This invention relates to improvements in drilling machines and has particular reference to machines for drilling articles such as ophthalmic lenses.

In the manufacture of ophthalmic mountings the lenses thereof are supported, in many cases, by lens straps to which the lenses are connected by screws, pins or other similar means. In such cases, therefore, it is necessary to drill holes through the lenses capable of receiving the connection means. When drilling such holes, it is common practice to first drill substantially one-half way through the lens from one side and then turn the lens over and drill from the reverse side to meet the first hole, thus avoiding cracking or chipping of the lens adjacent the hole.

In drilling holes in the above manner, the problem arises as to how to support the lens so that the axes of the holes drilled from the opposite sides of the lens will be coincident when drilling lenses wherein the curvatures of the opposed side surfaces vary. The prior art teaches the use of a machine wherein there is embodied a lens-supporting device which forms a part of the machine and which can be rotated to turn the lens supported thereby 180° so that the holes may be properly drilled. However, such a machine is unnecessarily large due to the large amount of travel of the spindle and is also space-taking due to the fact that the rotatable chuck requires considerable space for permitting free rotation of the lens. Also, in such machines a lens must normally be supported in a chuck in order to be drilled by the machine.

Therefore, it is the principal object of this invention to provide an improved lens drill of a small, compact nature which embodies a removable chuck which is arranged to carry a lens to be drilled in such manner that when the chuck is attached to the drill the lens will be supported in a position whereby the holes will be drilled on an axis disposed substantially normal to the intermedial plane of the lens at the point where the holes are formed.

Another object is to provide a lens drilling machine having means thereon for receiving a chuck and for drilling a hole in one side of a lens carried by said chuck, said means being so arranged as to receive said chuck when in inverted position and to drill a hole in the reverse side of the lens, with said resultant holes being axially aligned.

Another object is to provide a device of the above character wherein said removable chuck embodies means for supporting a lens in such a manner that the axis of the holes drilled therein will be substantially normal to a plane lying substantially midway between the side surfaces of the lens at the point of drilling.

Another object is to provide an improved lens drill constructed and arranged to drill lenses supported either by hand or by a chuck provided for the purpose.

A further object of the invention is to provide a lens drilling machine embodying improved means whereby a controlled amount of a suitable lubricating fluid may be deposited at will by the operator on the lens in the area to be drilled.

Another object is to provide a device of the above character embodying a flexible tube connected with a supply of lubricating fluid which tube has a portion thereof which is engaged by a spring-pressed plunger to pinch the walls of the tube together to normally prevent flow of fluid through the tube onto a lens, and a cam device adapted to be operated by the operator by a slight lifting of the drill-operating lever whereby the plunger may be released to allow a controlled amount of the fluid to be deposited upon the lens in the area to be drilled while the drill is in raised position out of engagement with the lens.

Other objects and advantages of the invention will become apparent from the following description taken in connection with the accompany drawings wherein:

Fig. 7 is an enlarged vertical sectional view of the chuck-supporting mechanism;

Fig. 8 is a top plan view of the mechanism shown in Fig. 7;

Fig. 9 is an enlarged top plan view of a lens-carrying chuck embodying the invention;

Fig. 10 is a sectional view taken substantially on line 10—10 of Fig. 9; and

Fig. 11 is a vertical sectional view taken substantially on line 11—11 of Fig. 10.

Figure 1:
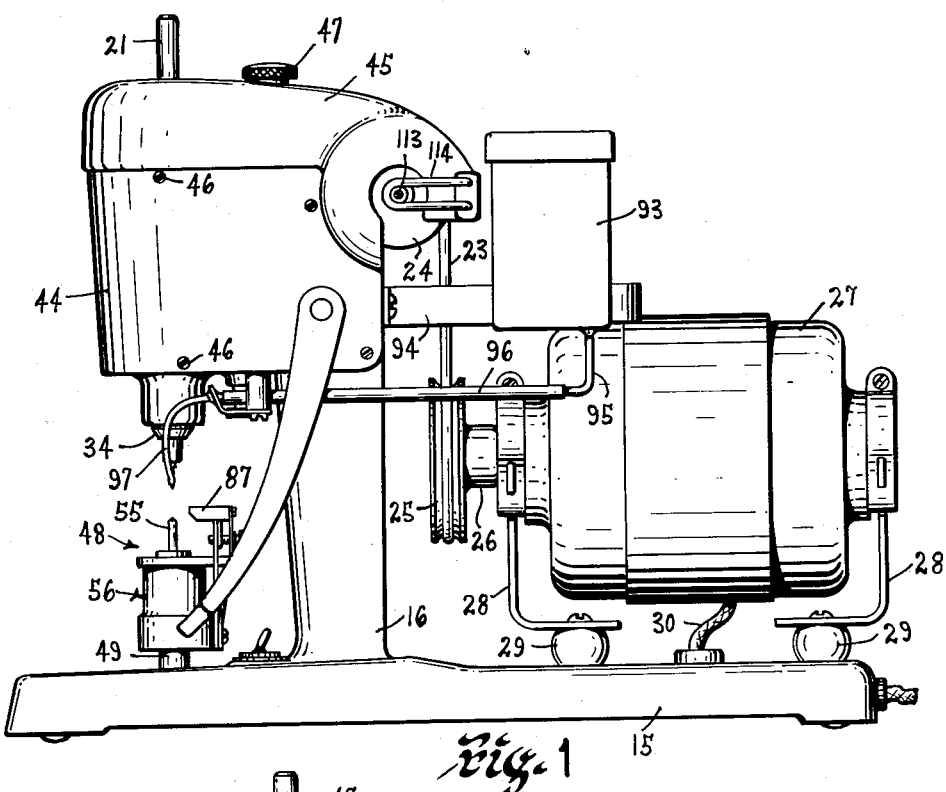
Fig. 1 is a side elevational view of a preferred embodiment of the invention.

Referring more particularly to the drawings wherein like characters of reference designate like parts throughout the several views, the device illustrated comprises a base 15 having an upright 16 thereon. The upright is provided at the upper end with a pair of vertically spaced relatively flat arms 17 and 18 which extend forwardly in overlying relation with the base 15.

The arms 17 and 18 are provided with substantially aligned openings in which are located bearings 19 and 20 respectively. A drill spindle 21 is rotatably mounted in the bearings 19—20 and is operatively connected by means of a pulley 22, mounted on the upper end thereof, to a belt 23 which extends rearwardly therefrom over a pair of spaced pulleys 24 carried by the rear side of the upper end of the upright 16, and thence downwardly to a pulley 25 which is mounted on the end of a motor shaft 26 which extends outwardly of a motor 27. The motor 27 is mounted on brackets 28 which are secured to the base 15 as by adjustable shock-absorbing connections 29.

The motor 27 is suitably connected to a source of electrical energy as by wiring 30 whereby the spindle 21 will be made to rotate through the belt and pulleys described above.

Figure 3:
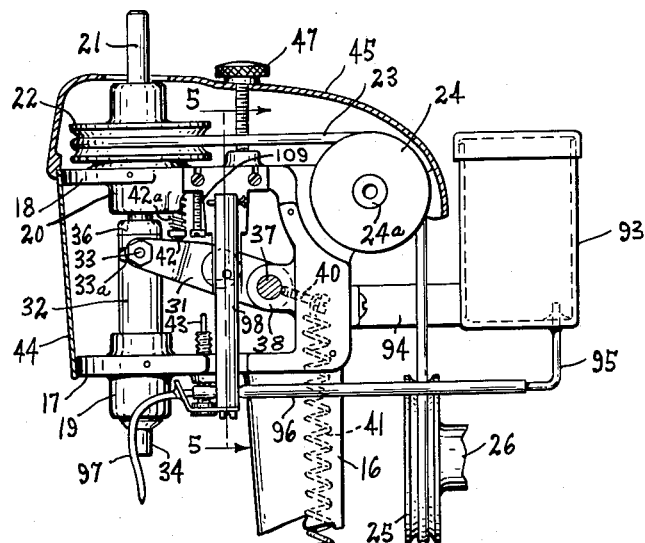
Fig. 3 is a fragmentary side elevational view of the device with a side wall thereon removed to show the drill operating mechanism.
Figure 4:
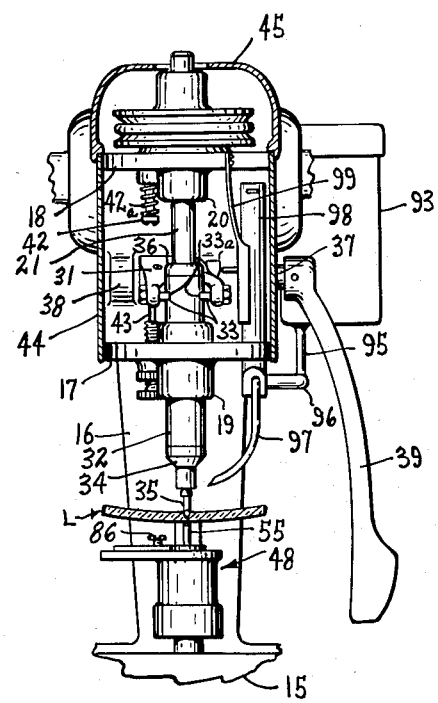
Fig. 4 is a fragmentary front elevational view of the device with the front portion of the wall removed to illustrate portions of the drill operating mechanism.

The spindle 21 is also mounted for vertical reciprocating movement in the bearings 19—20 and has one end of a lever 31 operatively connected thereto (Figs. 3 and 4). The end of the lever 31 is bifurcated with the bifurcations each carrying a pin 33, the ends of the pins 33 being positioned in grooves 33a formed on each side of a sleeve 32 which is mounted over the spindle 21. The spindle carries at its lower end a chuck 34 which is rotatable therewith and which carries a drill 35 of selected size. The lower end of the sleeve 32 rests upon the chuck 34 while a collar 36 is fixed to the spindle 21 adjacent the upper end of the sleeve 32. The opposed end of the lever 31 is mounted on a shaft 37 which is rotatably mounted in lugs 38 formed on the upright 16 (Fig. 3) and having a manually operable handle 39 secured to one end thereof. The lever 31 is locked tightly onto the shaft 37, as well as is the handle 39, by screws, pins or the like. A stud 40 mounted in the end of the lever 31 has one end of a spring 41 connected thereto, the other end of the spring 41 being suitably secured within the upright. The spring 41 thus acts upon stud 40 to urge the outer end of the lever 31 upwardly which in turn, through sleeve 32 and collar 36, urges the spindle 21 upwardly, the connection between the pins 33 and grooves 33a permitting lateral movement of the pins in the grooves to compensate for arcuate movement of the end of the lever 31 as it swings. The extent of upward movement of the spindle 21 is limited by the engagement of the lever 31 with a stop 42 carried in the under side of the upper arm 18. The spindle 21 is thus normally held in raised position with the lever 31 against stop 42. Pressure upon handle 39, however, will cause the shaft 37 and lever 31 to rotate against the tension of spring 41, which movement will move the sleeve 32 and spindle 21 downwardly. The extent of downward movement of the spindle 21 is limited by a second adjustable stop 43, which stop 43 is mounted in the lower arm 17 and is adapted to be engaged by the lever 31 as it swings downwardly on shaft 37. Upon release of the handle 39 spring 41 will function to return the parts to their normal positions.

Figure 2:
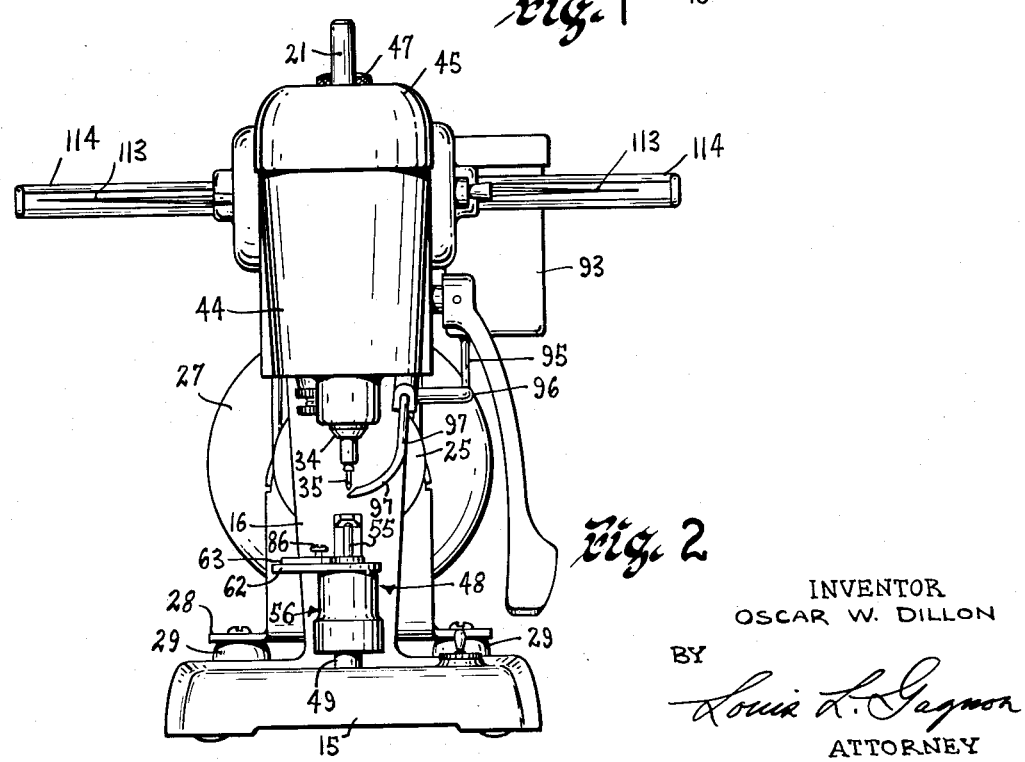
Fig. 2 is a front elevational view of the device shown in Fig. 1.

A housing 44 is mounted over the front and sides of the device (Figs. 1 and 2) and a cover 45 is located on the top thereof to aid in preventing foreign matter from interfering with the functions of the various operative parts, the housing being removably secured to various portions of the upright 16 and arms 17 and 18 by a plurality of screws 46, and the cover 45 being removably secured over the upper edge of the housing 44 and held thereupon by a knurled screw 47 which is threaded into the upper end of the upright 16.

On the base 15 beneath the spindle 21 is located a work holder 48 which comprises an upwardly extending post 49 which is provided at its lower end with an enlarged portion 50 which is located in an opening 51 in the base 15 and is provided approximately midway thereof with an annular flange 52 which engages the upper surface of the base 15. The post 49 is headed at its lower end 53 and has a washer 54 thereover which engages the lower surface of the base 15 and functions co-operatively with the flange 52, when the post is mounted, to retain the post 49 securely in position. The upper end of the post 49 has a vertically extending pin 55 fixedly mounted therein which functions as an anvil upon which a lens L (Fig. 4) rests during a drilling operation.

Mounted over the post 49 is a hollow support 56 which is shaped to slidably engage the post 49 at its upper end (Fig. 7). The central opening 57 in the support 56 is of a size to slidably receive a second flange 58 formed on the upper end of the enlarged portion 50 in spaced relation with flange 52. An angled member 59 is secured to the support as by a screw 60 and extends into the space between the flanges 58—52 and engages said flanges as the support 56 moves up and down on the post 49 and thus restricts the extent of travel thereof. A spring 61 which is mounted over the post 49 within the opening 57 functions to constantly urge the support in an upward direction whereby a chuck and lens may be subsequently mounted thereon without interference or striking of the anvil 55.

The upper end of the support 56 is provided with a transversely extending portion 62 the upper surface of which is provided with a longitudinally extending raised portion 63 the side walls of which are substantially parallel and, with the surface portions 64 on either side of the raised portion 63, form tracks on which are adapted to be positioned the selected pair of spaced rails 65 which are formed both on the upper and lower surfaces of a lens-supporting chuck 66 (Fig. 10).

The chuck 66 is shaped with an elongated body portion 67 adjacent one end of which are pivotally connected bifurcated jaws 68 (Figs. 9 and 10) formed on one end of a pair of vertically spaced grips 69. Springs 70 are positioned between the grips 69 and adjacent surfaces of the body portion 67 and urge the grips 69 outwardly on pivots 71, thus tending to close the jaws 68. The spaced ends of each of the jaws 68 carry therebetween crescent-shaped members 72 which are freely movable on pivots 73. The adjacent surfaces of the members 72 have correspondingly shaped pads 73 cemented or otherwise attached thereto which are adapted to engage the opposed side surfaces of the lens L to be drilled. An operator is merely required to depress the grips 69 to open the jaws 68 against the tension of springs 70 and to insert the lens L between pads 73, then to release the pressure upon the grips 69 and allow the springs 70 to function to cause the jaws 68 to close, whereupon the lens L will be firmly clamped between the pads 73 and the intermedial plane of the lens L, due to the balanced relation of springs 70, will be substantially aligned with the axis of the chuck.

A lens L before drilling must be marked so that the holes to be drilled therein will be properly related to the optical axis. For example, in Fig. 9 the lens L is marked as indicated at 74 to indicate the optical axis. In the example shown a hole is to be drilled on the axis 74 and, therefore, the axis 74 is aligned with a line 75 on the members 72.

The distance at which the hole to be drilled is to be spaced from the edge of the lens L is controlled by a stop 76 formed of hardened steel, nylon, or other durable material which is carried by one end of a shaft 77 which is located substantially on the axis of the chuck and extends longitudinally through the body portion 67. A sleeve 78 is threadedly mounted over the shaft 77 and has a portion 79 of small diameter which fits within a recess in the adjacent end of the body portion 67. The portion 79 is provided with a slot 80 therearound which receives the end of a set screw 81 which is carried by the body portion 67.

Thus the sleeve 78 may be rotated within the end of the body portion 67 and will thus move the shaft 77 longitudinally which will consequently move the stop 76 along the axis of the chuck toward and away from the anvil 55. On the outer end of the shaft 77 is threadedly mounted a knob 82 which is provided with a scale and graduations 83 (Fig. 9). To adjust the stop 76 so that a hole will be drilled at a predetermined distance from the edge of the lens L, the shaft 77 is adjusted by rotation of sleeve 78 to the position where the stop 76 will be located at the selected spaced relation with the anvil when the chuck 66 is mounted on the support 56. Then the knob 82 is adjusted on the shaft 77 so that the scale 83 will indicate the setting of the stop 76. A set screw 84 in the end of the knob 82 is operated to lock the knob 82 in adjusted position on the shaft 77.

A pin 85 is used to span each of the pairs of rails 65 and is so located as to be slightly above the surface of the raised portion 63 of the support 56 when the chuck 66 is located on the support 56. After the sleeve 78 has been rotated to position the stop 76 as desired in accordance with the distance from the edge of the lens L at which a hole is to be drilled, the lens L is positioned in the chuck 66 in the manner described above with the marked axis 74 thereof aligned with the line 75 and with its edge abutting the stop 76. The chuck 66 is then mounted on the support 56 with the rails 65 resting on the tracks 64 of the support 56 on either side of the raised portion 63. The chuck 66 is slid along on the tracks 64 until the pin 85 engages the shank portion of a stop 86 which is carred by the portion 62 of the support 56, lifting of the chuck off the support then being prevented by the engagement of the head of the stop 86 with the pin 84.

When the chuck 66 has thus been located on the support 56, the operator will press downwardly on the device which will cause the support 56 to move downwardly from its normal raised position on post 49 to the position shown in Fig. 10 whereupon the lens L will engage and be partially supported by the anvil 56 regardless of its thickness.

It will be understood that when the lens L is thus positioned in the chuck and mounted on the support 56, the drill 35 may be lowered by the operator, as described hereinbefore, into engagement with the adjacent surface of the lens L and will cause a hole to be formed therein. The action of the pivoted crescent-shaped members 72 and pads 73 on jaws 68 in gripping a lens L will automatically position the lens in such a manner that an intermedial plane of the lens, or plane lying substantially midway between the side surfaces of the lens irrespective of any difference in the radii of curvature of the surfaces, will be disposed substantially normal to the axis of the drill 35. Thus, a hole can be drilled part may through a lens from one side thereof, which hole will have an axis disposed substantially normal to said intermedial plane of the lens, and then the chuck 66 can be removed from the support 56 and replaced with the opposed surface of the lens being directed toward the drill 35. When the chuck is thus replaced on the support 56 the hole partially drilled in the under side of the lens will be automatically realigned with the drill 35. At this time a hole can be drilled in the upper surface of the lens and will accurately meet and be aligned with the first hole. Thus there is formed a single continuous straight hole through the lens adapted to receive a screw, rivet, or the like.

Although the use of a chuck for support of a lens may be preferred during a drilling operation, it may be desirable to support a lens by hand. In such a case, a lens to be drilled is placed on the anvil 55 and is positioned thereon so that the center of the anvil 55 is substantially on axis line 74. The edge of the lens is meanwhile brought into engagement with a stop 87 (Figs. 7 and 8) which is secured as by a screw 88 to the upper end of a spring arm 89. The spring arm 89 is pivotally secured with one end of a rigid arm 90 to the support 56 and is adapted to swing with arm 90 on screw 60. The other end of the rigid arm 90 engages the under side of the stop 87 and carries a block 91. A threaded opening is formed through the block 91 and arm 90 and receives the threaded shank of an adjusting screw 92 carried by the spring arm 89. Adjustment of screw 92 causes the spring arm 89 and consequently the stop 87 to move toward and away from the anvil 55 and thus controls the distance from the edge of a lens at which a hole is to be drilled.

It is to be understood, of course, that this stop device is to be swung to an upright position when the lens is to be manually supported and is to be moved downwardly out of the way when the chuck is to be used.

During a drilling operation, it is necessary to supply a lubricating fluid to the area of the lens being drilled. Therefore, there is provided a tank or reservoir 93 which is supported as by a bracket 94 (Figs. 1 and 3) carried by the upright 16. Fluid in the tank 93 is permitted to flow therefrom into a rigid tube 95 which connects with a flexible tube 96 formed of rubber, plastic or the like and which in turn connects with an arcuately shaped relatively rigid outlet tube 97. When the drill 35 is in raised inoperative position, the end of the outlet tube 97 is located directly over the area of the lens to be drilled.

Figure 5:
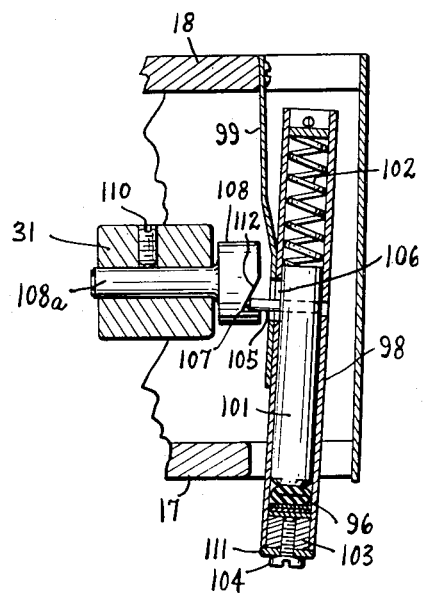
Fig. 5 is an enlarged fragmentary vertical sectional view taken substantially on line 5—5 of Fig. 3 looking in the direction of the arrows.
Figure 6:
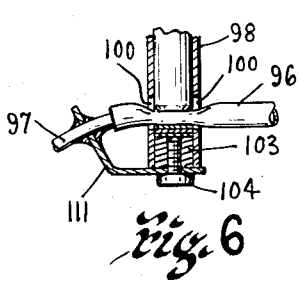
Fig. 6 is an enlarged fragmentary elevational view partly in section of the mechanism for controlling the flow of lubricating fluid.

The upper arm 18 of the upright 16 has a vertically extending tubular member 98 secured thereto by a flat spring member 99 (Figs. 4 and 5) and the flexible tube 96 passes through aligned openings 100 adjacent the lower end of the tubular member 98 (Fig. 6). Within the tubular member 98 is slidably located a plunger 101 which is continually urged downwardly against the flexible tube 96 by a coiled spring 102 which is located above the plunger 101 in the tubular member 98 and which presses the tube against a block 103 fixedly secured within the lower end of the tubular member 98. Such pressure upon the tube 96 causes the walls thereof to be compressed as shown in Figs. 5 and 6 and thus prevents flow of fluid therethrough.

To relieve pressure upon the tube, the plunger is provided with a pin 105 which extends outwardly through a vertical slot 106 in the tubular member 98. The end of the pin 105 rests within a recess 107 formed in a cam member 108 provided on one end of a shaft 108a which is carried by the lever 31 and held therein by means such as a set screw 110. The lower surface or wall of the recess 107 is substantially parallel with the pin 105 and forms a shelf on which the pin 105 rests. When the handle 39 is lifted by the drill operator the lever 31 will cause the stop 42 to move upwardly against the tension of a spring 42a thereon to an extent whereupon the lever 31 engages a second fixed stop 109 carried by arm 18. This upward movement of the lever 31 will consequently move the cam 108 upwardly which in turn, through pin 105, will move the plunger 101 upwardly against the tension of spring 102. This permits the walls of the tube 96 to automatically tend to assume their normal shapes and permits fluid to flow therethrough.

It will be understood that the flow of fluid onto a lens is entirely under the control of the operator who merely has to release the handle 39 when sufficient fluid has escaped, whereupon the springs 42a, 41 and 108 will return the various operative parts of the device to their normal inoperative positions. It is also to be noted here that due to the fact that when the drill 35 is raised the end of the arcuate tube 97 is positioned to allow the fluid to drop onto the area of the lens which is to be drilled. Thus, if an operator decided during a drilling operation that he needed more fluid, he merely would raise the handle 39 to withdraw the drill from the lens and continue to lift the handle until the fluid passed through the tubes as described above. Thus a controlled amount of fluid would drop into the partially drilled hole exactly where needed.

The upper end of the arcuate tube 97 is supported by a bracket 111 which is secured to the block 103 in the lower end of the tubular member 98 as by a screw 104. Thus, it can be adjusted as by bending so that the fluid will be dropped where desired.

To move the arcuate tube 97 out of the way of the drill 35 for the actual drilling operation, the bottom of the recess 107 in the cam member 108 is inclined as indicated at 112 in Fig. 5. Thus, when the operator depresses the handle 39 to move the drill 35 toward the lens L, movement downwardly of the lever 108 will, through the inclined surface 112, upon which rides the ends of pin 105, cause the pin 105 to move the plunger 101 and consequently the tubular member 98 outwardly in a direction away from the lever 31, such movement being permitted by the resiliency of the flat spring 99 which constantly urges the tubular member 98 toward the lever 31. Thus, the bracket 111 and arcuate tube 97 are moved outwardly simultaneously.

Release of the handle 39 and consequent automatic return thereof to normal inoperative position simultaneously causes return of the arcuate tube 97 to its position overlying the area being drilled, without, however, the undesired flow of the fluid until such a time as desired by the operator.

It is to be understood that if desired the pulley shaft 24a may be made sufficiently long enough to extend through the side walls of the housing 44 and to carry on each end reamers 113 (Figs. 1, 2 and 3) which are rotatable with the shaft 24a. The reamers 113 may be used to treat the holes drilled in the lenses and have angled wire-like guards 114 extending around them to protect the operator of the device from possible injury.

From the foregoing description it will be apparent that all of the objects and advantages of the invention have been accomplished and that many advantages of the present invention exist as outlined therein. However, it will also be apparent that many changes may be made in the arrangement of parts and method shown and described without departing from the spirit of the invention. Therefore, it is to be understood that all matter shown or described is to be interpreted as illustrative and not in a limiting sense.

I claim:

1. A lens drilling machine comprising the combination of a base having a drill support and a work support thereon, one of which supports is mounted for movement along a predetermined axis toward and away from the other support, said work support comprising a chuck-receiving portion and an anvil, a separate removable chuck adapted to support a lens to be drilled and having attachment means on one side thereof shaped to fit with means located in predetermined position on said chuck-receiving portion and having similar attachment means on its opposite side shaped to fit with said means so as to be located in said predetermined relation on said chuck-receiving portion for presenting the opposed side surface of the lens to said drill support, said chuck having lens gripping and locating elements for retaining a lens in such a position that when said chuck is mounted on said work support the intermedial plane of the lens adjacent the side to be drilled will be located substantially normal to the predetermined axis of movement of said movable support, said chuck-receiving portion being normally held under spring tension whereby a lens will normally be spaced from said anvil and being movable under pressure whereby said lens will be brought into engagement with said anvil, said anvil being substantially in axial alignment with the said drill support for engagement with and for supporting the portion of the lens in which the hole is to be formed, said chuck further being provided with stop means adapted to be engaged by the edge of said lens, said stop means being adjustable longitudinally of said chuck to a selective spaced relation to said anvil for controlling the distance from the edge of the lens at which the hole is to be drilled, and operating means connected with said movable support for moving same toward the other of said supports whereby a drill carried by said drill support will form a hole in said lens.

2. A lens drilling machine comprising the combination of a base having a work support thereon and having a drill support thereon movable toward and away from said work support, said drill support being adapted to support a drill for movement therewith along a predetermined axis, said work support comprising a chuck-receiving portion and an anvil, said chuck-receiving portion being movable longitudinally of said anvil and normally held under spring tension in raised position with respect thereto, a separate removable chuck adapted to support a lens to be drilled and having an interfitting portion on one side thereof shaped to engage with means provided on said chuck-receiving portion so as to locate the removable chuck in a predetermined position, said chuck being adapted for presenting one side surface of the lens to said drill support while positioning the opposed side surface of the lens upon said anvil when said chuck-receiving portion is moved in opposition to said spring tension, said anvil being located to engage and support the lens in the area in which the hole is to be drilled, said chuck embodying spring actuated clamp arms having lens gripping pad elements pivotally connected thereto for yieldably engaging and retaining said lens in such a position that when said chuck is mounted on said work support with the selected interfitting portion thereof in said predetermined relation on said chuck-receiving portion said predetermined axis along which said drill is movable is substantially normal to the intermedial plane of said lens at the point of intersection therewith, and means connected to said drill support for moving the drill into engagement with the adjacent surface of the lens for forming a hole part way therethrough, said chuck having a second interfitting portion of similar character on the side thereof opposed to said first interfitting portion whereby said lens may be positioned on said work support with the opposed side surface thereof directed toward the drill and whereby a hole therethrough may be formed in axial alignment with the first hole when the drill is moved into engagement therewith, said chuck further being provided with stop means adapted to be engaged by the edge of said lens, said stop means being adjustable longitudinally of said chuck to a selective spaced relation to said anvil for controlling the distance from the edge of the lens at which the hole is to be drilled.

3. A drilling machine comprising the combination of a drill support and a work support, one of which supports is mounted for movement toward and away from the other support, said work support being adapted to locate a piece of work for engagement by a drill carried by said drill support, operating means connected with said movable support for moving same toward the other of said supports whereby said drill carried by said drill support will form a hole in said work, said operating means comprising a manually operable lever connected to said movable support, and lubricant control means having an exit portion adapted to be positioned in overlying relation with said work and having a flexible tube portion connecting said exit portion with a supply of lubricant, spring-pressed means acting on said flexible tube portion to close the opening therethrough and means connected with said manually operable lever for relieving the pressure of said spring-pressed means by movement of said lever whereby upon operation thereof a controlled amount of lubricant may be permitted to escape and be deposited on the surface of said work.

4. A lens drilling machine comprising the combination of a base having a work support thereon and a drill support which is movable toward and away from said work support and which is adapted to support a drill for movement therewith along a predetermined axis toward and away from engagement with a lens mounted on said drill support, operating means connected with said drill support comprising a manually operable lever which when moved in one direction will cause movement of the drill toward said lens whereby said drill when in engagement with said lens will form a hole in the lens, said manually operable lever normally being held in an inoperative position intermediate the ends of its path of travel, and lubricant control means carried by said machine and comprising a tube having its outlet end portion thereof overlying said lens and having its other end connected with a supply of lubricant, closure means preventing flow of lubricant through said tube, said closure means being operatively connected to said manually operable lever and opened by movement of said lever out of its inoperative position in a direction opposite to that which is required to move the drill toward the lens whereby lubricant will be permitted to flow from the tube and be deposited on the surface of the lens.

5. A lens drilling machine comprising a base having a drill support and a work support thereon, one of which supports is mounted for movement toward and away from the other support along a predetermined axis, an operating lever connected with the movable support for moving same toward the other of said supports to permit the drill carried by one support to form a hole in a lens carried by the other support, and lubricant means including a supply reservoir and an outlet portion communicating with said reservoir, said outlet portion being mounted on the machine for movement into and out of a position adjacent said predetermined axis, and means operably connecting said outlet portion and operating lever in a manner such that movement of the movable support by the lever toward the other support will cause the outlet portion to swing out of position adjacent said predetermined axis and return to said position when the movable support is moved by the lever away from the other support.

6. A lens drilling machine comprising a base having a drill support and a work support thereon, one of which supports is mounted for movement toward and away from the other support along a predetermined axis, an operating lever connected with the movable support for moving same toward the other of said supports to permit the drill carried by one support to form a hole in a lens carried by the other support, said lever being normally maintained at a position spaced intermediate the opposed ends of its possible path of travel, and lubricant means including a supply reservoir for lubricant, an outlet portion communicating with said reservoir, and normally closed valve means preventing the flow of lubricant to said outlet portion, said valve means being operated by movement of the lever in a direction reverse to that required to move the movable support, said outlet portion being mounted on the machine for movement into and out of alignment with said predetermined axis, along which the movable support moves so as to overlie the area of the lens to be drilled at the point of intersection of said predetermined axis and said area of the lens to be drilled, and means operably connected to said outlet portion and so located that movement of the movable support by the lever toward the other support will cause the outlet portion to swing out of alignment with said predetermined axis and return thereto only when the movable support is moved by the lever away from the other support.

7. In a lens drilling machine embodying a work support and a drill support mounted for movement toward and away from the work support wherein the work support embodies a chuck-receiving portion having guide means provided thereon with which a work-carrying chuck may be located, a separate removable chuck unit for use therewith comprising a support having a pair of arms with ends extending forwardly of said support, said arms being adjustably mounted on said support for movement of said ends toward and away from each other, spring means for maintaining said ends toward each other, and a pair of lens-engaging pad portions pivotally connected to said ends for engaging on opposite sides of a lens and holding it in a controlled positional relation, and said support further having a portion for engaging with said guide means on the chuck-receiving portion whereby the chuck may be located on said chuck-receiving portion to position first one surface and then the other surface of the lens held by said gripping elements in a predetermined relation for drilling purposes.

8. A drilling machine comprising the combination of a drill support and a work support, one of which supports is mounted for movement toward and away from the other support, said work support being adapted to locate a piece of work for engagement by a drill carried by said drill support, operating means connected with said movable support for moving same toward the other of said supports whereby said drill carried by said drill support will form a hole in said work, said operating means comprising a manually operable lever connected to said movable support and lubricant control means having an exit portion adapted to be positioned in overlying relation with said work and having a flexible tube portion connecting said exit portion with a supply of lubricant, spring-pressed means acting on said flexible tube portion to close the opening therethrough and means for relieving the pressure of said spring-pressed means whereby upon operation thereof a controlled amount of lubricant may be permitted to escape and be deposited on the surface of said work.

9. A lens drilling machine comprising the combination of a base having a work support thereon and a drill support which is movable toward and away from said work support and which is adapted to support a drill for movement therewith along a predetermined axis toward and away from engagement with a lens mounted on said drill support, operating means connected with said drill support comprising a manually operable lever which when moved in one direction will cause movement of the drill toward said lens along said predetermined axis whereby said drill when in engagement with said lens will form a hole in the lens at the point of intersection of said axis therewith, said manually operable lever normally being held in an inoperative position intermediate the two ends of its path of travel by spring means, and lubricant means mounted on said machine and comprising a tube having its outlet end portion mounted for movement into and out of alignment with said predetermined axis in overlying relation with said lens and having its other end connected with a supply of lubricant, closure means for said tube operatively connected to said lever in a manner such that movement of said manually operable lever in a direction opposite to that which is required to move the drill toward the lens will cause said outlet end portion to be moved into alignment with said predetermined axis and simultaneously open said closure means to permit a controlled amount of lubricant to flow and be deposited on the surface of the lens at said point of intersection of said predetermined axis, and cam means movable with said lever and connected with said tube whereby when said lever is moved in the direction required to move the drill toward the lens, said outlet end portion of the tube will be moved away from overlying relation with said predetermined surface area to be drilled.

10. A lens drilling machine comprising the combination of a base having a drill support and a work support thereon, one of which supports is movable along a predetermined axis toward and away from the other support, said work support having a chuck-receiving and locating portion and an anvil thereon, a separate chuck unit having self-contained means for gripping, locating and holding a lens in a given position in said chuck and having substantially identical attachment means on the opposed sides thereof for selective positioning in said chuck-receiving portion of the work support and being adapted to automatically locate the area of the lens to be drilled in a given position with respect to said anvil regardless of what side surface of the lens is presented to said anvil by removal of said separate chuck unit from said chuck-receiving and locating portion, and by reversing and positioning the opposed attachment means in said chuck-receiving and locating portion, and means connected with said movable support for moving same toward the other of said supports whereby a drill carried by said drill support will form a hole in the lens as the result of drilling into the opposed sides of said lens.

11. A lens drilling machine comprising the combination of a base having a drill support and a work support thereon, one of which supports is movable along a predetermined axis toward and away from the other support, said work support having a chuck-receiving and locating portion and an anvil thereon, a separate chuck unit having self-contained means for gripping and holding a lens in a given position in said chuck and having substantially identical portions on the opposed sides thereof shaped to be selectively detachably connected with said chuck-receiving and locating portion on said work support to automatically locate the desired drilling area of either side surface of the lens to be drilled in a given position with respect to said predetermined axis, and means connected with said movable support for moving same toward the other of said supports whereby a drill carried by said drill support will form a hole in said area of said lens as the result of drilling into the opposed sides of said lens at said given position with respect to said predetermined axis.

12. A lens drilling machine comprising the combination of a base having a drill support and a work support thereon, one of which supports is mounted for movement toward and away from the other support, said work support having a chuck-receiving portion and an anvil thereon, a separate chuck unit having self-contained means for gripping and holding a lens, adjustable means thereon for controlling the position of the lens in said chuck and having substantially identical attachment means on the opposed sides thereof for selective reversible positioning in said chuck-receiving portion of the work support, stop means on said work support adapted to automatically locate the area of the lens to be drilled in a given position with respect to said anvil regardless of what side surface of the lens is presented to said anvil by removal of said separate chuck unit from said chuck-receiving portion and by reversing the same and positioning the opposed attachment means in the chuck-receiving portion and in engagement with the stop means and means connected with said movable support for moving same toward the other of said supports whereby a drill carried by said drill support will form a hole in said area of the lens as the result of drilling into the opposed sides of said lens.

13. A lens drilling machine comprising the combination of a base having a drill support and a work support thereon, one of which supports is mounted for movement toward and away from the other support, said work support having a chuck-receiving slideway and an anvil thereon, a separate chuck unit having self-contained means for gripping, locating and holding a lens in a given position in said chuck and having substantially identical slide means on the opposed sides thereof for selective reversible positioning in said chuck-receiving slideway of the work support, stop means on said work support being adapted to automatically locate the area of the lens to be drilled in a given position with respect to said anvil regardless of what side surface of the lens is presented to said anvil by removal of said separate chuck unit from said chuck-receiving slideway and by reversing the same and positioning the opposed slide in the slideway and in engagement with the stop means and means connected with said movable support for moving same toward the other of said supports whereby a drill carried by said drill support will form a hole in said area of the lens as the result of drilling into the opposed sides of said lens.

References Cited in the file of this patent

UNITED STATES PATENTS

| | | |
|---|---|---|
| 710,184 | Clements | Sept. 30, 1902 |
| 1,222,559 | Moffitt | Apr. 10, 1917 |
| 1,337,682 | Woolson | Apr. 20, 1920 |
| 1,447,761 | Clarke | Mar. 6, 1923 |
| 1,665,771 | Cady | Apr. 10, 1928 |
| 2,058,808 | Long | Oct. 27, 1936 |

FOREIGN PATENTS

| | | |
|---|---|---|
| 474,700 | Germany | Apr. 9, 1929 |